United States Patent
Makino

(10) Patent No.: US 6,819,461 B2
(45) Date of Patent: Nov. 16, 2004

(54) MULTIBEAM LIGHT SOURCE AND MULTIBEAM SCANNER

(75) Inventor: Hideyo Makino, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 10/631,829

(22) Filed: Aug. 1, 2003

(65) Prior Publication Data

US 2004/0129872 A1 Jul. 8, 2004

(30) Foreign Application Priority Data

Aug. 1, 2002 (JP) .................................... 2002-225089
Oct. 31, 2002 (JP) .................................... 2002-319135

(51) Int. Cl.⁷ .............................................. G02B 26/08
(52) U.S. Cl. ................................. 359/204; 347/243
(58) Field of Search .................... 359/204, 212–219, 359/196, 197, 900; 347/232–244; 358/296, 300, 302, 505, 474, 481, 494, 496, 497–498

(56) References Cited

U.S. PATENT DOCUMENTS 6,121,993 A * 9/2000 Maekawara et al. ........ 347/236
6,313,935 B1 11/2001 Makino
6,320,647 B1 11/2001 Makino
6,731,418 B2 * 5/2004 Ishibe ........................ 359/204

FOREIGN PATENT DOCUMENTS

| JP | 56-4224 | 4/1981 |
| JP | 8-136841 | 5/1996 |
| JP | 9-1861 | 1/1997 |
| JP | 9-26550 | 1/1997 |
| JP | 9-211350 | 8/1997 |
| JP | 9-251137 | 9/1997 |
| JP | 2727198 | 3/1998 |

* cited by examiner

*Primary Examiner*—James Phan
(74) *Attorney, Agent, or Firm*—Oblon, Spivak, McClelland, Maier & Neustadt, P.C.

(57) ABSTRACT

A multibeam light source includes a plurality of semiconductor laser arrays, and a deflector. A sub-scanning beam pitch is defined by a distance between an arbitrary point on a line connecting focuses of a preceding array and a point that corresponds to the arbitrary point on a line connecting focuses of an adjoining array. The sub-scanning beam pitch is set as $P=(A/VM) \cdot VS+C$, where P is a recording density interval on the recoding medium, VM is a main scanning velocity, VS is a sub-scanning velocity, A is an interval between the focuses on the recording medium in a main scanning direction, and C is a correction amount of the beam pitch.

15 Claims, 2 Drawing Sheets

MULTIBEAM LIGHT SOURCE AND MULTIBEAM SCANNER

BACKGROUND OF THE INVENTION

1) Field of the Invention

The present invention relates to a method of setting a sub-scanning beam pitch of a multibeam light source for an information recording apparatus such as a laser printer, a digital copier, and a facsimile.

2) Description of the Related Art

Recently, a high speed recording with a high recording density is required for an information recording apparatus such as a laser printer and a digital copier. To meet the requirement, a multibeam scanner is widely used, which simultaneously scans a recording medium, such as a photo conductor, with a plurality of laser beams.

Some of light sources having a plurality of laser beams use a semiconductor laser array in which a plurality of semiconductor lasers are arranged in an array on the same substrate. The light sources are disclosed, for example, in Japanese Patent Application Laid Open No. 56-42248, 9-26550, and 8-136841.

Conventionally, an interval between emission points in the semiconductor laser array is 100 µm or more to avoid a cross interference between lasers. Recently, however, a semiconductor laser array in which the interval between emission points is 20 µm or less is available because of improved isolation technology and semiconductor fabrication technology.

On the other hand, some of the light sources have a function of correcting a plurality of laser beams in order to improve resolution and image quality. Such light sources are disclosed, for example, in Japanese Patent Application Laid-Open Publication No. 9-251137, 9-211350, 9-1861, and Japanese Patent No. 2727198.

However, the technology described in Japanese Patent Application Laid-Open Publication No. 9-251137 requires a complex sensor and a complicated beam detection algorithm, and the technology described in Japanese Patent Application Laid-Open Publication No. 9-211350 and 9-1861 requires a correction of a write-out position.

In Japanese Patent No. 2727198, a method of performing a beam-scanning is disclosed. This method includes correcting positions of laser beams so as to arrange the laser beams deviated in a main scanning direction on the same position to perform the beam-scanning. However, Japanese Patent No. 2727198 does not describe a so-called multibeam light source that simultaneously uses the laser beams for scanning. Furthermore, a pitch error caused by a plane tilt error of a deflecting reflector is not taken into account.

SUMMARY OF THE INVENTION

It is an object of the present invention to solve at least the problems in the conventional technology.

The multibeam light source according to one aspect of the present invention includes a plurality of semiconductor laser arrays, wherein each semiconductor laser array includes a plurality of semiconductor lasers each of which emits a laser beam, and a deflector that receives the laser beams and deflects the laser beams towards a recording medium, whereby an array of focuses is formed on the recording medium corresponding to each semiconductor laser array, wherein a sub-scanning beam pitch is set as P−(A/VM)·VS+C, where P is a recording density interval on the recoding medium, VM is a main scanning velocity, VS is a sub-scanning velocity, A is an interval between the arrays of focuses in a main scanning direction, and C is a correction amount of the beam pitch, wherein the sub-scanning beam pitch is defined by a distance between an arbitrary point on a line connecting focuses of a preceding array of the focuses and a point that corresponds to the arbitrary point on a line connecting focuses of an adjoining array of the focuses.

The multibeam light source according to another aspect of the present invention includes a plurality of semiconductor laser arrays, wherein each semiconductor laser array includes a plurality of semiconductor lasers each of which emits a laser beam, and a deflector that receives the laser beams and deflects the laser beams towards a recording medium, whereby an array of focuses is formed on the recording medium corresponding to each semiconductor laser array, wherein a sub-scanning beam pitch is set as P−(A/VM)·VS+C, where P is a recording density interval on the recoding medium, VM is a main scanning velocity, VS is a sub-scanning velocity, A is an interval between the arrays of focuses in a main scanning direction, and C is a correction amount of the beam pitch, wherein the sub-scanning beam pitch is defined by a distance between a most preceding array of the focuses and an adjoining array of the focuses.

The multibeam light source according to still another aspect of the present invention includes a plurality of semiconductor laser arrays, wherein each semiconductor laser array includes a plurality of semiconductor lasers each of which emits a laser beam, and a deflector that receives the laser beams and deflects the laser beams towards a recording medium, whereby an array of focuses is formed on the recording medium corresponding to each semiconductor laser array, wherein a sub-scanning beam pitch is set as P−(A/VM)·VS+C, where P is a recording density interval on the recoding medium, VM is a main scanning velocity, VS is a sub-scanning velocity, A is an interval between the arrays of focuses in a main scanning direction, and C is a correction amount of the beam pitch, wherein the sub-scanning beam pitch is defined by a distance between a center of focuses of a first semiconductor laser array and a center of focuses of a second semiconductor laser array, wherein the first semiconductor laser array scans first in a main scanning direction and the second semiconductor laser array scans next in the main scanning direction.

The multibeam scanner according to still another aspect of the present invention includes a multibeam light source having a plurality of semiconductor laser arrays, wherein each semiconductor laser array includes a plurality of semiconductor lasers each of which emits a laser beam, and a deflector that receives the laser beams and deflects the laser beams towards a recording medium, whereby an array of focuses is formed on the recording medium corresponding to each semiconductor laser array, wherein a sub-scanning beam pitch is set as P−(A/VM)·VS+C, where P is a recording density interval on the recoding medium, VM is a main scanning velocity, VS is a sub-scanning velocity, A is an interval between the arrays of focuses in a main scanning direction, and C is a correction amount of the beam pitch, wherein the sub-scanning beam pitch is defined by a distance between an arbitrary point on a line connecting focuses of a preceding array of the focuses and a point that corresponds to the arbitrary point on a line connecting focuses of an adjoining array of the focuses.

The multibeam scanner according to still another aspect of the present invention includes a multibeam light source having a plurality of semiconductor laser arrays, wherein each semiconductor laser array includes a plurality of semiconductor lasers each of which emits a laser beam, and a deflector that receives the laser beams and deflects the laser beams towards a recording medium, whereby an array of focuses is formed on the recording medium corresponding to each semiconductor laser array, wherein a sub-scanning beam pitch is set as P−(A/VM)·VS+C, where P is a recording density interval on the recoding medium, VM is a main scanning velocity, VS is a sub-scanning velocity, A is an interval between the arrays of focuses in a main scanning direction, and C is a correction amount of the beam pitch, wherein the sub-scanning beam pitch is defined by a distance between a most preceding array of the focuses and an adjoining array of the focuses.

The multibeam scanner according to still another aspect of the present invention includes a multibeam light source having a plurality of semiconductor laser arrays, wherein each semiconductor laser array includes a plurality of semiconductor lasers each of which emits a laser beam, and a deflector that receives the laser beams and deflects the laser beams towards a recording medium, whereby an array of focuses is formed on the recording medium corresponding to each semiconductor laser array, wherein a sub-scanning beam pitch is set as P−(A/VM)·VS+C, where P is a recording density interval on the recoding medium, VM is a main scanning velocity, VS is a sub-scanning velocity, A is an interval between the arrays of focuses in a main scanning direction, and C is a correction amount of the beam pitch, wherein the sub-scanning beam pitch is defined by a distance between a center of focuses of a first semiconductor laser array and a center of focuses of a second semiconductor laser array, wherein the first semiconductor laser array scans first in a main scanning direction and the second semiconductor laser array scans next in the main scanning direction.

The method of scanning according to still another aspect of the present invention includes setting a sub-scanning beam pitch as P−(A/VM)·VS+C, where P is a recording density interval on the recoding medium, VM is a main scanning velocity, VS is a sub-scanning velocity, A is an interval between the arrays of focuses in a main scanning direction, and C is a correction amount of the beam pitch, wherein the sub-scanning beam pitch is defined by a distance between an arbitrary point on a line connecting focuses of a preceding array of the focuses and a point that corresponds to the arbitrary point on a line connecting focuses of an adjoining array of the focuses, wherein the method of scanning is used on a multibeam scanner including a plurality of semiconductor laser arrays, wherein each semiconductor laser array includes a plurality of semiconductor lasers each of which emits a laser beam, and a deflector that receives the laser beams and deflects the laser beams towards a recording medium, whereby an array of focuses is formed on the recording medium corresponding to each semiconductor laser array.

The method of scanning according to still another aspect of the present invention includes setting a sub-scanning beam pitch as P−(A/VM)·VS+C, where P is a recording density interval on the recoding medium, VM is a main scanning velocity, VS is a sub-scanning velocity, A is an interval between the arrays of focuses in a main scanning direction, and C is a correction amount of the beam pitch, wherein the sub-scanning beam pitch is defined by a distance between a most preceding array of the focuses and an adjoining array of the focuses, wherein the sub-scanning beam pitch is defined by a distance between an arbitrary point on a line connecting focuses of a preceding array of the focuses and a point that corresponds to the arbitrary point on a line connecting focuses of an adjoining array of the focuses, wherein the method of scanning is used on a multibeam scanner including a plurality of semiconductor laser arrays, wherein each semiconductor laser array includes a plurality of semiconductor lasers each of which emits a laser beam, and a deflector that receives the laser beams and deflects the laser beams towards a recording medium, whereby an array of focuses is formed on the recording medium corresponding to each semiconductor laser array.

The method of scanning according to still another aspect of the present invention includes setting a sub-scanning beam pitch as P−(A/VM)·VS+C, where P is a recording density interval on the recoding medium, VM is a main scanning velocity, VS is a sub-scanning velocity, A is an interval between the arrays of focuses in a main scanning direction, and C is a correction amount of the beam pitch, wherein the sub-scanning beam pitch is defined by a distance between a center of focuses of a first semiconductor laser array and a center of focuses of a second semiconductor laser array, wherein the first semiconductor laser array scans first in a main scanning direction and the second semiconductor laser array scans next in the main scanning direction, wherein the method of scanning is used on a multibeam scanner including a plurality of semiconductor laser arrays, wherein each semiconductor laser array includes a plurality of semiconductor lasers each of which emits a laser beam, and a deflector that receives the laser beams and deflects the laser beams towards a recording medium, whereby an array of focuses is formed on the recording medium corresponding to each semiconductor laser array.

The other objects, features and advantages of the present invention are specifically set forth in or will become apparent from the following detailed descriptions of the invention when read in conjunction with the accompanying drawings.

DETAILED DESCRIPTION

Exemplary embodiments of the present invention are explained below with reference to the accompanying drawings.

Figure 1:
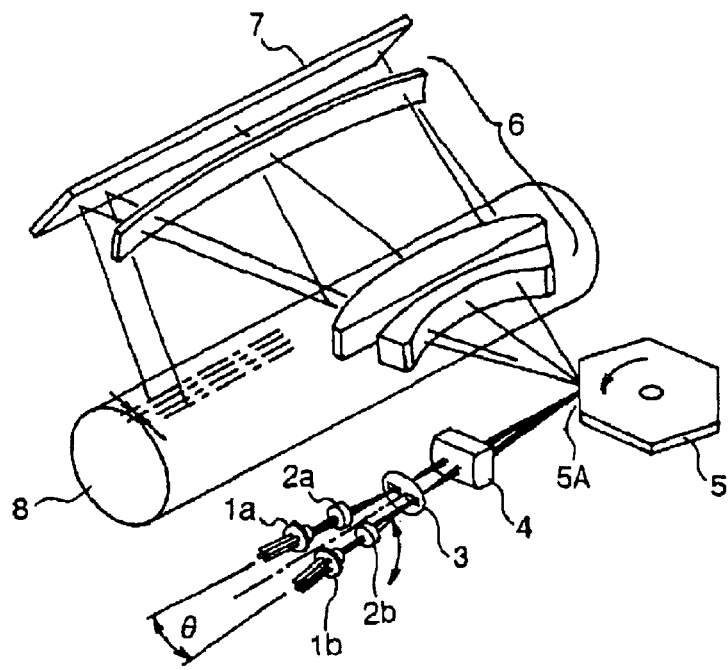
FIG. 1 is a schematic diagram of a multibeam scanner according to an embodiment of the present invention.

FIG. 1 is a schematic diagram of a multibeam scanner according to an embodiment of the present invention. A semiconductor laser array 1a and 1b emits laser beams, collimating lenses 2a and 2b collimate the laser beams into parallel light fluxes or substantially parallel light fluxes, and an aperture 3 shapes the light fluxes. A cylindrical lens 4 that is common to each flux focuses the beam-shaped fluxes in the sub-scanning direction to form an image as a linear image elongated in the main scanning direction in the vicinity of a deflecting reflective facet 5A of a deflector 5. The formed image is then reflected by the deflecting reflective facet 5A. A plurality of linear images corresponding to the laser beams are separated from one another in the sub-scanning direction.

The light fluxes reflected by the deflecting reflective facet 5A of the deflector 5 are deflected at a constant angular velocity in association with rotation of the deflector 5 at a constant velocity. The deflected fluxes are focused through a mirror 7 onto the recording medium 8 such as a photo conductor by an optical scanning system 6. More specifically, the optical scanning system 6 is formed with a lens system such as an f θ lens shown in FIG. 1. However, the optical scanning system 6 may be formed with a concave mirror other than the above system, and the fluxes are collected in the sub-scanning direction as optical spots that are separated from each other on the recording medium 8. Then, the recording medium 8 is scanned with the optical spots at a substantially constant velocity. Although FIG. 1 illustrates an example an array of two semiconductor lasers, it is possible to increase a number of beams by increasing a number of the semiconductor lasers and the collimating lens.

As shown in FIG. 1, main beams that are collimated into the parallel light fluxes or substantially parallel light fluxes by the collimating lenses 2a and 2b are gradually approaching each other toward the deflecting reflective facet 5A in the main scanning direction. The main beams are intersected with each other in the main scanning direction at a point near the deflecting reflective facet 5A. An angle θ formed by the light fluxes is referred to as "an opening angle" between the fluxes. More specifically, the angle θ is formed by the light fluxes in the direction from the intersection side toward the light source side when viewed from the sub-scanning direction. The light source is structured so that the light fluxes directed toward the deflector 5 have an opening angle θ, thus eliminating the need for deflecting and synthesizing devices that are conventionally required.

Figure 2:
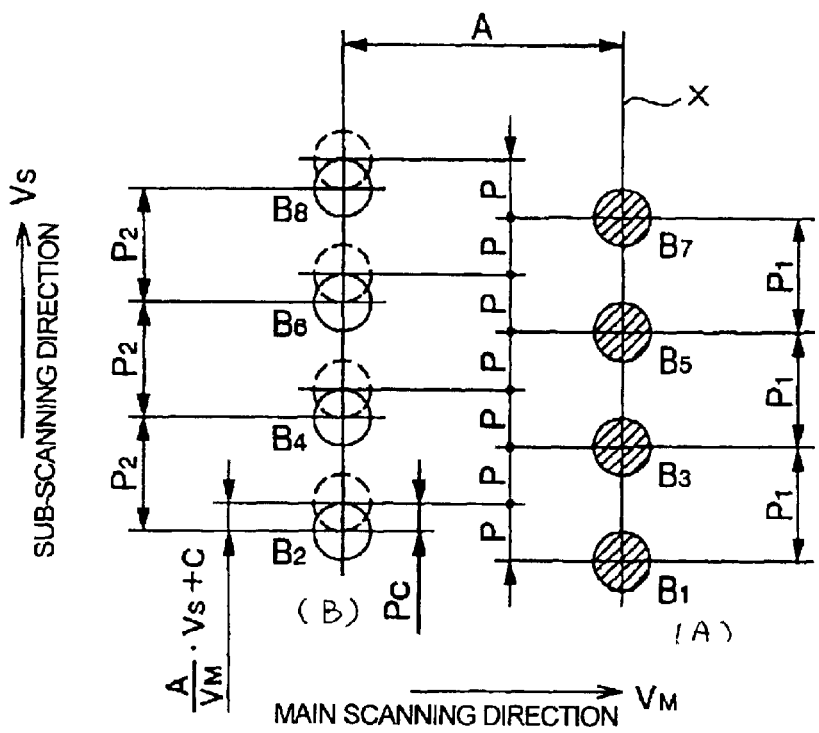
FIG. 2 is a schematic diagram of an arrangement of eight beams on a recording medium.

FIG. 2 is a schematic diagram of an arrangement of eight beams on the recording medium 8. A lateral direction of the paper plane indicates the main scanning direction, that is, scanning is performed from left to right, and a longitudinal direction indicates the sub-scanning direction, that is, scanning is performed from down to up. A velocity in the main scanning direction is VM (mm/s) and a velocity in the sub-scanning direction of the recording medium 8 is VS (mm/s).

B1, B3, B5, and B7 represent focuses (shaded circles) formed on the recording medium by one semiconductor laser array having four semiconductor lasers. B2, B4, B6, and B8 represent focuses (hollow circles) formed on the recording medium by another semiconductor laser array having four semiconductor lasers. Beams in the sub-scanning direction are arranged alternately in the order of B1, B2, B3, . . . , B8. While beams in the main scanning direction are arranged so that the beams of odd numbers like B1, B3, B5, . . . , B7 precede.

In this case, the beams B1, B3, B5, and B7 are separated from the beams B2, B4, B6, and B8 by a distance A on the recording medium 8 in the main scanning direction. The distance A is provided because the light source has the opening angle. An interval of the semiconductor lasers of the semiconductor laser array is formed with high precision through the semiconductor process, and therefore focus intervals P1 and P2 in the sub-scanning direction on the recording medium 8 are determined by a lateral magnification of an optical system.

In the present invention, the beam intervals P1 and P2 are the same as each other, and ½ of each interval P1 and P2 is a recording interval P for a desired recording density. In this case, the beams B1, B3, B5, and B7 always precede the beams B2, B4, B6, and B8 in the main scanning direction by the distance A (mm), and a time lag between the beams becomes A/VM (s). The recording medium 8 is moved in the sub-scanning direction by (A/VM)·VS (mm) for a time corresponding to the time lag. Therefore, if the subsequent beams B2, B4, B6, and B8 are arranged in advance so that the interval of beams B2, B4, B6, and B8 is less than the interval P for the recording density by (A/VM)·VS, then the desired recording density can be obtained.

Although FIG. 2 illustrates only the beams reflected by the same deflecting reflective facet, the deflecting reflective facet is continuously changed from one reflective facet to another. The pitch of beams reflected by adjacent reflective facets is insufficient in positional precision caused by the plane tilt error of the deflecting reflective facets, as compared with the pitch of beams reflected by the same reflective facet.

Figure 3:
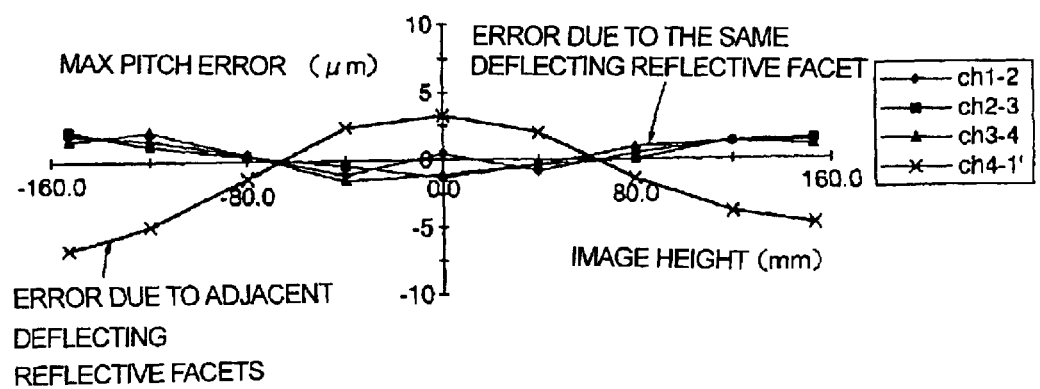
FIG. 3 is a graph of a beam pitch error in a sub-scanning direction on a recording medium on the vertical axis vs. a position (image height) on the recording medium on the horizontal axis.

FIG. 3 illustrates a beam pitch error in the sub-scanning direction on the recording medium set at Y axis and a position (image height) on the recording medium set at X axis. A thin line represents the error due to the same deflecting reflective facet, like between B1 and B2, B2 and B3, and so on. A thick line represents the error due to adjacent deflecting reflective facets, like between B8 by one facet and B1 by the adjacent facet.

As explained above, only by arranging the beams so that the interval of the beams is less than the interval P for the recording density by (A/VM)·VS, the beam array becomes nonuniform at a position corresponding to a joint of adjacent facets because a pitch error due to the adjacent facets is not taken into account. Therefore, an image may be degraded. To solve the problem, a correction amount C of the beam pitch is determined based on the optical system and the plane tilt of the deflecting reflective facet, and the determined correction amount is added to correct the beam array, thus obtaining a uniform beam array.

That is, an error in pitch between adjacent beams reflected by the same reflective facet and an error in pitch between adjacent beams reflected by the adjacent reflective facets are changed according to an image height as shown in FIG. 3, and particularly the error due to the adjacent reflective facets is largely changed. Therefore, if the correction amount of +C is not added, the pitch may be largely deviated depending on the image height. Thus, the correction amount of +C is added so that the same level of pitch errors is achieved over the whole image height.

More specifically, each position of beam spots is measured at a position of an image surface on the photo conductor to measure a beam pitch in the sub-scanning direction. For example, three image heights are measured at a center and both edges of the image, and the correction amount C is determined at a point where the pitch due to the adjacent reflective facets and the pitch due to the same reflective facet are balanced. In this case, the pitches are supposed to have the same tendency if measurement is conducted by the same optical system, and therefore it is practical to determine the correction amount by a correction value obtained through experiments, although the measurement is sometimes performed individually. It is also considered that an image is evaluated by a pattern in which a pitch difference between the adjacent reflective facets and the same reflective facet is visually seen, and that a correction value is determined based on the evaluation. That is, the correction value is determined so as to obtain a visually well-balanced image.

A specific way to add a correction amount C may be realized by determining a correction amount C in advance based on the pitch and the evaluation of the image in the same manner as explained above, adjusting an inter-center pitch to a value of P−(A/VM)·VS+C when the light source unit (device) is adjusted, and the unit is fixed with a screw. Alternatively, the unit is made movable by a motor or the like in place of the fixing and can be controlled thereby. If a unit for measuring a beam pitch is provided, then a correction amount C is made variable by performing feedback control. Further, if a relationship between a temperature and a pitch is previously obtained, then a correction amount C is made variable by monitoring the temperature.

The embodiments of the present invention to be executed in the above manner will be explained below.

In a first embodiment of the present invention as shown in FIG. 2, it is assumed that a virtual straight line X connects the preceding beams B1, B3, B5, and B7 from the semiconductor lasers as odd numbers. Further, a beam pitch in the sub-scanning direction (between "A" and "B") between a given point "A" on the vertical straight line X and a point "B" is set to P−(A/VM)·VS+C. Specifically, the point "B" is a point between the preceding beam and a beam adjacent to the beam and corresponds to the point "A".

The vertical straight line X is a straight line (line segment) vertically drawn on the recording medium. Specifically, the focuses are created on the recording medium by a plurality of semiconductor lasers of the semiconductor laser array and the line passes through the centers of the beams (B1 through B7 are connected as shown in FIG. 2). The given point "A" may be any point at a center of the beam or on the straight line if the point is on the vertical straight line (B1 to B7). More specifically, the given point "A" includes a center of the beam B1 and a middle point between the beams B3 and B5. The corresponding point "B" is a point corresponding to the point "A". For example, if "A" is B1, then "B" is B2, and if "A" is a middle point between B3 and B5, then "B" is a middle point between B4 and B6.

In a second embodiment of the present invention, the beam pitch in the sub-scanning direction between the most preceding beam (B1 to B7) and the beam (B2 to B8) adjacent to the most preceding beam is set to a value of P−(A/VM)·VS+C.

In a third embodiment of the present invention, the beam pitch in the sub-scanning direction between a center position of the beam (B1 to B7) of the semiconductor laser array that performs preceding scanning and a center position of the beam (B2 to B8) of another semiconductor laser array that performs subsequent scanning is set to a value of P−(A/VM)·VS+C. Specifically, each of the preceding scanning and the subsequent scanning is performed in the main scanning direction on the recording medium. According to the third embodiment, the beam pitch is determined based on each distance between semiconductor lasers of the semiconductor laser array and a lateral magnification of the optical system. If there is a variation in distances between the semiconductor lasers, then an error between beam pitches in the laser array is changed. In order to reduce the variation, the distance is defined based on distances between the centers of beams but not defined directly based on distances between the beams, and thereby the variation in the distances can be averaged.

Numerical values obtained by the embodiments of the present invention will be described below. Simulations were performed on dimensional precision and tolerances of the optical system and a temperature range assuming that a recording interval for a desired recording density P is 21.2 µm (density: 1200 dpi), a main scanning velocity VM: 1,363,159 mm/s, a sub-scanning velocity VS: 500 mm/s, and (A/VM)·VS: about 8.2 µm if the interval in the main scanning direction A is 22.3 mm. As a result of the simulations, it is found that the beam pitches between the adjacent facets and the same facet were balanced when the correction amount C of the beam pitch was −2.8 µm. The beam pitch in the sub-scanning direction between the most preceding beam and the beam adjacent to that in the embodiment is as follows.

$$P-(A/VM)\cdot VS+C=21.2\ \mu m-(22.3\times 103\ \mu m/1,363,159\ mm/s)\cdot 500\ mm/s-2.8\ \mu m=10.2\ \mu m$$

In the embodiments, the arrangement of the eight laser beams using two semiconductor laser arrays each having four semiconductor lasers has been described, but the number of beams is not limited to four.

According to the first and second aspects of the present invention, the beam pitch in the sub-scanning direction between the most preceding beam and the adjacent beam is set to the value of P−(A/VM)·VS+C. Therefore, a speedup of a recording speed and a high recording density are achieved and positions of beam spots are uniformly formed on the recording medium such as a photo conductor. Thus, it is possible to improve resolution and image quality.

According to the third aspect of the present invention, in addition to the advantageous effect explained above, there is another advantageous effect as follows. The beam pitch is determined based on each distance between semiconductor lasers of the semiconductor laser array and the lateral magnification of the optical system. If there is a variation in distances of the semiconductor lasers, then an error between beam pitches in the laser array is changed. In order to reduce the variation, the distance is defined based on distances between the beam centers but not defined directly based on distances between the beams, and thereby the variation can be averaged.

According to the fourth aspect of the present invention, in the multibeam light source as the first aspect, the laser beams emitted from the semiconductor laser arrays and directed toward the deflector have a predetermined opening angle. Therefore, a speedup of a recording speed and a high recording density are achieved and positions of beam spots are uniformly formed on the recording medium. Thus, it is possible to improve resolution and image quality.

According to the fifth aspect of the present invention, in the multibeam light source as the first or second aspect, the interval for the recording density on the recording medium is 50 µm or less. Therefore, a speedup of a recording speed and a high recording density are achieved and positions of beam spots are uniformly formed on the recording medium. Thus, it is possible to improve resolution and image quality.

According to the sixth aspect of the present invention, the multibeam scanner employs the multibeam light source as any of the first to third aspects. Therefore, a speedup of a recording speed and a high recording density are achieved and positions of beam spots are uniformly formed on the recording medium. Thus, it is possible to improve resolution and image quality.

The present document incorporates by reference the entire contents of Japanese priority documents, 2002-225089 filed in Japan on Aug. 1, 2002 and 2002-319135 filed in Japan on Oct. 31, 2002.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A multibeam light source comprising:
a plurality of semiconductor laser arrays, wherein each semiconductor laser array includes a plurality of semiconductor lasers each of which emits a laser beam; and
a deflector that receives the laser beams and deflects the laser beams towards a recording medium, whereby an array of focuses is formed on the recording medium corresponding to each semiconductor laser array, wherein
a sub-scanning beam pitch is set as P−(A/VM)·VS+C, where P is a recording density interval on the recoding medium, VM is a main scanning velocity, VS is a sub-scanning velocity, A is an interval between the arrays of focuses in a main scanning direction, and C is a correction amount of the beam pitch, wherein the sub-scanning beam pitch is defined by a distance between an arbitrary point on a line connecting focuses of a preceding array of the focuses and a point that corresponds to the arbitrary point on a line connecting focuses of an adjoining array of the focuses.

2. The multibeam light source device according to claim 1, wherein the laser beams received by the deflector have a predetermined opening angle.

3. The multibeam light source according to claim 1, wherein the recording density interval is 50 μm or less.

4. A multibeam light source comprising:
a plurality of semiconductor laser arrays, wherein each semiconductor laser array includes a plurality of semiconductor lasers each of which emits a laser beam; and
a deflector that receives the laser beams and deflects the laser beams towards a recording medium, whereby an array of focuses is formed on the recording medium corresponding to each semiconductor laser array, wherein
a sub-scanning beam pitch is set as P−(A/VM)·VS+C, where P is a recording density interval on the recoding medium, VM is a main scanning velocity, VS is a sub-scanning velocity, A is an interval between the arrays of focuses in a main scanning direction, and C is a correction amount of the beam pitch, wherein the sub-scanning beam pitch is defined by a distance between a most preceding array of the focuses and an adjoining array of the focuses.

5. The multibeam light source device according to claim 4, wherein the laser beams received by the deflector have a predetermined opening angle.

6. The multibeam light source according to claim 4, wherein the recording density interval is 50 μm or less.

7. A multibeam light source comprising:
a plurality of semiconductor laser arrays, wherein each semiconductor laser array includes a plurality of semiconductor lasers each of which emits a laser beam; and
a deflector that receives the laser beams and deflects the laser beams towards a recording medium, whereby an array of focuses is formed on the recording medium corresponding to each semiconductor laser array, wherein
a sub-scanning beam pitch is set as P−(A/VM)·VS+C, where P is a recording density interval on the recoding medium, VM is a main scanning velocity, VS is a sub-scanning velocity, A is an interval between the arrays of focuses in a main scanning direction, and C is a correction amount of the beam pitch, wherein the sub-scanning beam pitch is defined by a distance between a center of focuses of a first semiconductor laser array and a center of focuses of a second semiconductor laser array, wherein the first semiconductor laser array scans first in a main scanning direction and the second semiconductor laser array scans next in the main scanning direction.

8. The multibeam light source device according to claim 7, wherein the laser beams received by the deflector have a predetermined opening angle.

9. The multibeam light source according to claim 7, wherein the recording density interval is 50 μm or less.

10. A multibeam scanner comprising a multibeam light source including
a plurality of semiconductor laser arrays, wherein each semiconductor laser array includes a plurality of semiconductor lasers each of which emits a laser beam; and
a deflector that receives the laser beams and deflects the laser beams towards a recording medium, whereby an array of focuses is formed on the recording medium corresponding to each semiconductor laser array, wherein
a sub-scanning beam pitch is set as P−(A/VM)·VS+C, where P is a recording density interval on the recoding medium, VM is a main scanning velocity, VS is a sub-scanning velocity, A is an interval between the arrays of focuses in a main scanning direction, and C is a correction amount of the beam pitch, wherein the sub-scanning beam pitch is defined by a distance between an arbitrary point on a line connecting focuses of a preceding array of the focuses and a point that corresponds to the arbitrary point on a line connecting focuses of an adjoining array of the focuses.

11. A multibeam scanner comprising a multibeam light source including
a plurality of semiconductor laser arrays, wherein each semiconductor laser array includes a plurality of semiconductor lasers each of which emits a laser beam; and
a deflector that receives the laser beams and deflects the laser beams towards a recording medium, whereby an array of focuses is formed on the recording medium corresponding to each semiconductor laser array, wherein
a sub-scanning beam pitch is set as P−(A/VM)·VS+C, where P is a recording density interval on the recoding medium, VM is a main scanning velocity, VS is a sub-scanning velocity, A is an interval between the arrays of focuses in a main scanning direction, and C is a correction amount of the beam pitch, wherein the sub-scanning beam pitch is defined by a distance between a most preceding array of the focuses and an adjoining array of the focuses.

12. A multibeam scanner comprising a multibeam light source device including
a plurality of semiconductor laser arrays, wherein each semiconductor laser array includes a plurality of semiconductor lasers each of which emits a laser beam; and
a deflector that receives the laser beams and deflects the laser beams towards a recording medium, whereby an array of focuses is formed on the recording medium corresponding to each semiconductor laser array, wherein
a sub-scanning beam pitch is set as P−(A/VM)·VS+C, where P is a recording density interval on the recoding medium, VM is a main scanning velocity, VS is a sub-scanning velocity, A is an interval between the arrays of focuses in a main scanning direction, and C is a correction amount of the beam pitch, wherein the sub-scanning beam pitch is defined by a distance between a center of focuses of a first semiconductor laser array and a center of focuses of a second semiconductor laser array, wherein the first semiconductor laser array scans first in a main scanning direction and the second semiconductor laser array scans next in the main scanning direction.

13. A method of scanning used on a multibeam scanner, the multibeam scanner including a plurality of semiconductor laser arrays, wherein each semiconductor laser array includes a plurality of semiconductor lasers each of which emits a laser beam, and a deflector that receives the laser beams and deflects the laser beams towards a recording medium, whereby an array of focuses is formed on the recording medium corresponding to each semiconductor laser array, the method comprising:

setting a sub-scanning beam pitch as $P-(A/VM) \cdot VS+C$, where P is a recording density interval on the recoding medium, VM is a main scanning velocity, VS is a sub-scanning velocity, A is an interval between the arrays of focuses in a main scanning direction, and C is a correction amount of the beam pitch, wherein the sub-scanning beam pitch is defined by a distance between an arbitrary point on a line connecting focuses of a preceding array of the focuses and a point that corresponds to the arbitrary point on a line connecting focuses of an adjoining array of the focuses.

14. A method of scanning used on a multibeam scanner, the multibeam scanner including a plurality of semiconductor laser arrays, wherein each semiconductor laser array includes a plurality of semiconductor lasers each of which emits a laser beam, and a deflector that receives the laser beams and deflects the laser beams towards a recording medium, whereby an array of focuses is formed on the recording medium corresponding to each semiconductor laser array, the method comprising:

setting a sub-scanning beam pitch as $P-(A/VM) \cdot VS+C$, where P is a recording density interval on the recoding medium, VM is a main scanning velocity, VS is a sub-scanning velocity, A is an interval between the arrays of focuses in a main scanning direction, and C is a correction amount of the beam pitch, wherein the sub-scanning beam pitch is defined by a distance between a most preceding array of the focuses and an adjoining array of the focuses.

15. A method of scanning used on a multibeam scanner, the multibeam scanner including a plurality of semiconductor laser arrays, wherein each semiconductor laser array includes a plurality of semiconductor lasers each of which emits a laser beam, and a deflector that receives the laser beams and deflects the laser beams towards a recording medium, whereby an array of focuses is formed on the recording medium corresponding to each semiconductor laser array, the method comprising:

setting a sub-scanning beam pitch as $P-(A/VM) \cdot VS+C$, where P is a recording density interval on the recoding medium, VM is a main scanning velocity, VS is a sub-scanning velocity, A is an interval between the arrays of focuses in a main scanning direction, and C is a correction amount of the beam pitch, wherein the sub-scanning beam pitch is defined by a distance between a center of focuses of a first semiconductor laser array and a center of focuses of a second semiconductor laser array, wherein the first semiconductor laser array scans first in a main scanning direction and the second semiconductor laser array scans next in the main scanning direction.

* * * * *